(12) United States Patent
Strandjord et al.

(10) Patent No.: US 6,204,921 B1
(45) Date of Patent: Mar. 20, 2001

(54) SYSTEM FOR SUPPRESSION OF RELATIVE INTENSITY NOISE IN A FIBER OPTIC GYROSCOPE

(75) Inventors: Lee K. Strandjord, Tonka Bay, MN (US); Gary W. Adams, Carefree; Dick Ang, Glendale, both of AZ (US)

(73) Assignee: Honeywell, Inc., Morristown, NJ (US)

( * ) Notice: Subject to any disclaimer, the term of this patent is extended or adjusted under 35 U.S.C. 154(b) by 0 days.

(21) Appl. No.: 09/223,235

(22) Filed: Dec. 30, 1998

(51) Int. Cl.[7] ................................................. G01C 19/64
(52) U.S. Cl. ............................................................... 356/350
(58) Field of Search ............................... 356/350; 382/12

(56) References Cited

U.S. PATENT DOCUMENTS 5,627,644 * 5/1997 Sanders ................................ 356/350
5,926,275 * 7/1999 Sanders et al. ..................... 356/350

* cited by examiner

Primary Examiner—Samuel A. Turner
(74) Attorney, Agent, or Firm—Kris T. Fredrick

(57) ABSTRACT

A system is disclosed which suppresses relative intensity noise in a fiber optic gyroscope. A high-speed intensity modulator is placed in the gyroscope light path between the fiber light source and a tap coupler which provides a sample of the modulated signal for use in a feedback loop. A photodetector receives the sampled signal and provides current-to-voltage conversion of the signal. A high-bandwidth voltage amplifier then adjusts the gain and phase of the converted signal and drives the intensity modulator in such a manner as to stabilize the control loop and provide suppression of relative intensity noise. The present system modulates the intensity of the light at a frequency which is sufficiently high to allow suppression of high frequency components of the relative intensity noise.

10 Claims, 4 Drawing Sheets

SYSTEM FOR SUPPRESSION OF RELATIVE INTENSITY NOISE IN A FIBER OPTIC GYROSCOPE

This invention was funded under United States Government contract no. Z77MV03430.

BACKGROUND OF THE INVENTION

1. Problem

Interferometric fiber optic gyroscopes ('fiber optic gyros') typically use a solid state (semiconductor) laser as a light source to produce light at wavelengths in the near-infrared region, between 0.83 micrometer and 1.55 micrometers. This type of light source emits broadband light whose broadband spectral components interact within the fiber optical channel to produce a type of noise called relative intensity noise. Relative intensity noise is a limiting factor with respect to the noise performance of fiber optic gyros. Several approaches have been used by the prior art to reduce the effects of relative intensity noise. These include:

(a) open loop noise subtraction;

(b) a closed loop system using bias modulation feedback; and (c) a closed loop system using light source pump current feedback.

Method (a) is practically limited because it uses a reference channel that is assumed to have perfect gain stability. Method (b) serves to reduce relative intensity noise but introduces degradation in gyro bias stability and gyro scale factor linearity. Method (c) is bandwidth limited and fails to suppress higher frequency components of relative intensity noise. These higher frequency components contribute significantly to output randomness and corresponding degradation in fiber optic gyro performance. The resulting signal-to-noise ratio establishes a noise floor based on the contribution of relative intensity noise which limits the effectiveness of a servo or closed loop system such as (c) which employs phase modulation of the light source pump current.

A commonly implemented type of interferometric fiber optic gyroscope 100, as shown in FIG. 1A, uses bias signal modulation to provide sensitivity to rotation of fiber optic sensing coil 103. In operation, the light emitted from light source 110 is modulated by bias modulator 108. Bias modulator 108 typically generates a square wave signal which is applied to phase modulator 109. A beam splitter (which is part of integrated optics package 112) separates the modulated light into two paths which travel in opposite directions through fiber optic sensing coil 103. The light returning from sensing coil 103 is sampled using tap coupler 104. The sampled light is applied to photodetector 105, which senses the optical signal in the form of a current and converts the sensed current to voltage. The output from photodetector 105 is then converted to a digital signal by analog-to-digital (A/D) convertor 106. The digital output from A/D convertor 106 is demodulated by demodulator 107, using a clock signal provided by bias modulator 108. Synchronous demodulation of the bias signal, at the bias modulation frequency, is used to extract gyro sensing coil rotation information to obtain a gyroscope output signal. Bias loop control electronics 111 includes a closed-loop signal generator and a readout circuit (not shown) which provides a pulse train output on line 113, where each pulse is equivalent to an increment of angular rotation of fiber optic sensing coil 103.

FIG. 1B is a diagram showing a prior art servo loop used for controlling the intensity of a fiber light source. As shown in FIG. 1B, system 100 employs a feedback loop for controlling fiber light source 110 by using relatively low bandwidth (approximately 100–200 kilohertz) servo electronics 140 to vary the fiber light source pump current via pump current controller 150. This method uses intensity modulation of the light to allow the servo circuitry to compensate for lower frequency components of relative intensity noise. However, because of the practical upper limit on the frequency of the pump current modulation, this method is inherently limited to suppression of relatively low frequency relative intensity noise components.

The sampling of the analog output of the photodetector 105 creates a problem not addressed by the prior art. Sampling of the photodetector output signal causes relative intensity noise components to appear at harmonics of the bias modulation frequency, and also causes beat frequency products to appear at the sampling frequency, plus and minus the harmonic frequencies. These relative intensity noise components need to be suppressed in order to remove the contribution of relative intensity noise to fiber optic gyroscope performance.

The output of demodulator 107 is sensitive to signals at the bias modulation frequency and the odd harmonics of the bias modulation frequency. The sensitivity to odd harmonics at the input is proportional to the inverse of the harmonic number (i.e. $\frac{1}{3}$, $\frac{1}{5}$, $\frac{1}{7}$ for the third, fifth and seventh harmonics). The total output noise of the demodulator is the RSS (root-sum-square) of the individual noise components. Because the sensitivity to input noise at the odd harmonics appears to decrease rapidly with the harmonic number, it was thought that a relative intensity noise-suppressing servo would only have to reduce noise at the bias modulation frequency and the first couple of odd harmonics of the bias modulation frequency. However, the input noise for a fiber optic gyro employing a low frequency servo increases rapidly when the servo open loop gain starts to decrease with higher frequencies. The noise spectrum at the input of analog-to-digital convertor 106 (when the servo is in operation) increases rapidly and exhibits higher peaks than the noise spectrum observed when the servo is not employed. Because of the rapid increase in noise at the higher odd harmonics, and because there are many odd harmonics that contribute to the total noise output of demodulator 107, the noise contribution of the higher harmonics limits the total noise reduction realized at the output of the demodulator.

The bandwidth of the prior art servo, as determined by the frequency response to variations in pump power, is limited to about 3 kilohertz (kHz) due to the presence of a section of erbium doped optical fiber which is part of the light source 110. To increase the bandwidth of the prior art servo beyond 3 kHz, the overall gain is increased so that the open loop gain at frequencies higher than 3 kHz is much greater than unity, thus in effect, compensating for the frequency roll-off of the erbium fiber. However, the amount of gain increase is limited by the current limits of the pump diode. If the gain is increased too high, then the pump diode is saturated with noise current, which produces undesirable effects for gyro operation. Because of this limitation, the bandwidth of the prior art servo is limited to about 100 kHz. For this type of relative intensity noise servo, the total noise reduction realized at the output of the demodulator is limited to about a factor of 4.

A high performance fiber optic gyro requires a noise reduction factor of 8 realized at the demodulator output. To achieve this magnitude of noise reduction, the input-to-output transfer function of the demodulator dictates that the servo bandwidth needs to be about 800 kHz or higher. Therefore, an intensity modulator having higher bandwidth than that of the prior art is needed to control the intensity of the light applied to the gyro sensing coil.

2. Solution

The present invention overcomes the foregoing problems and achieves an advance in the art by providing a system which suppresses relative intensity noise in a fiber optic gyroscope. In the present system, a feedback loop (servo loop) comprising a high bandwidth intensity modulator, a tap coupler, a photodetector and a high bandwidth servo controller, functions to drive intensity fluctuations in the fiber optic gyroscope light path to a significantly lower level than achievable with prior art methods.

A high-speed intensity modulator is placed in the gyroscope light path between the fiber light source and a tap coupler which provides a sample of the modulated signal for use in a feedback loop. A photodetector receives the sampled signal and provides current-to-voltage conversion of the signal. A high-bandwidth voltage amplifier then adjusts the gain and phase of the converted signal and drives the intensity modulator, via negative feedback, in such a manner as to stabilize the control loop and provide suppression of relative intensity noise. The present system modulates of the intensity of the light at a frequency of approximately one megahertz which is sufficient to allow suppression of high frequency components of the relative intensity noise.

BRIEF DESCRIPTION OF THE DRAWING

The present invention may be better understood from a reading of the following description thereof taken in conjunction with the drawing in which.

DETAILED DESCRIPTION

Figure 1A:
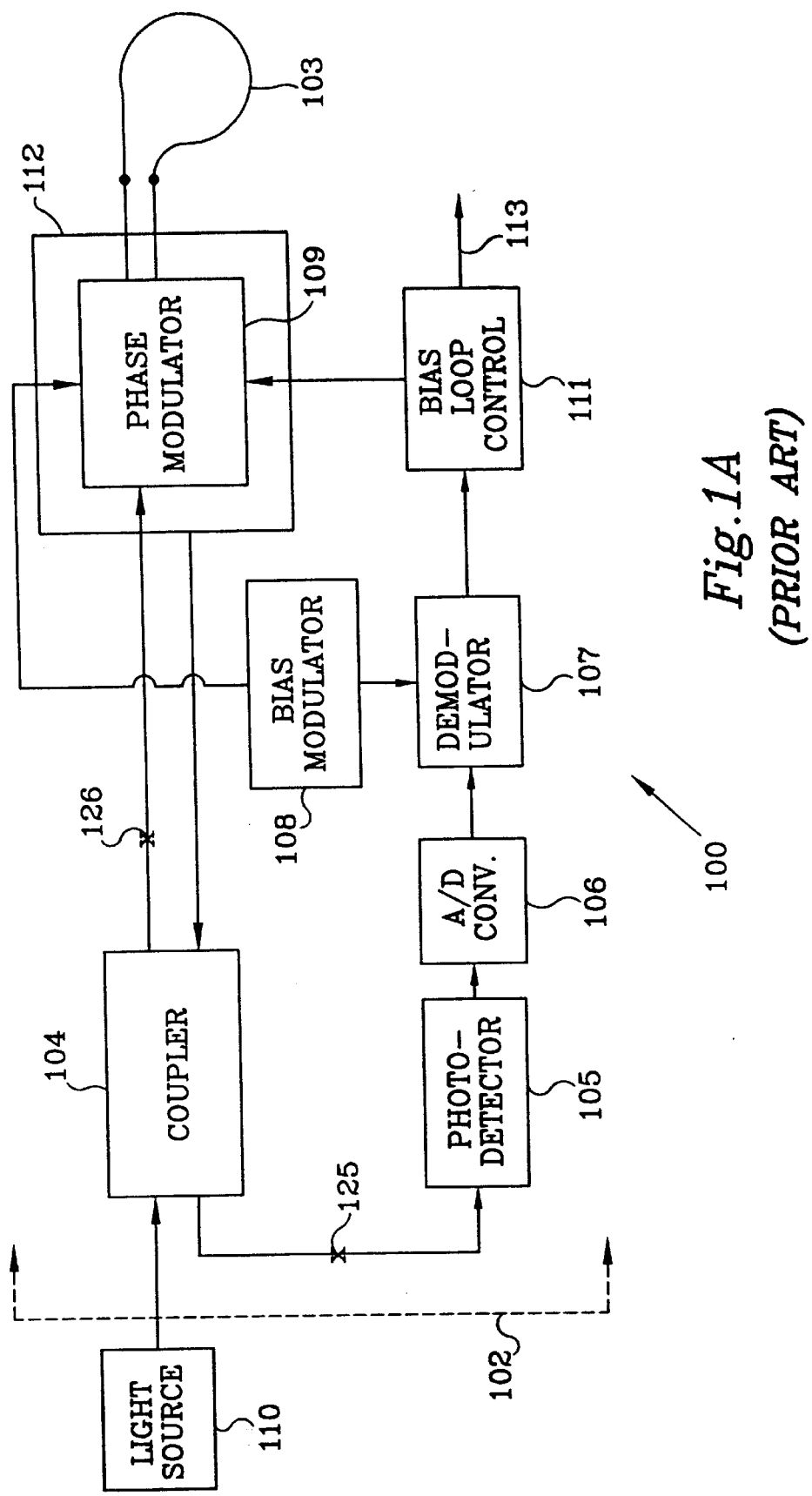
FIG. 1A is a block diagram of a prior art fiber optic gyroscope.
Figure 1B:
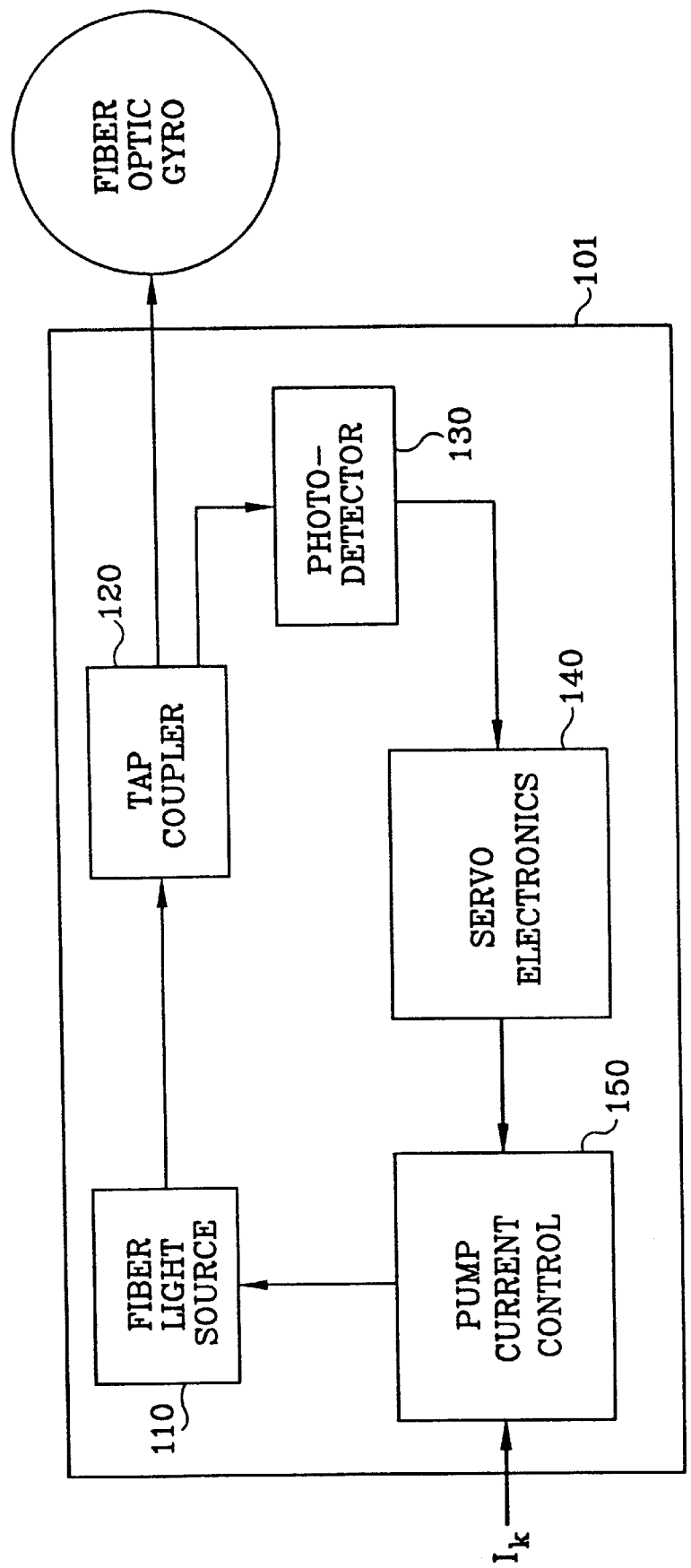
FIG. 1B is a diagram showing a prior art servo loop used for controlling the intensity of a fiber light source.

FIG. 1B is a block diagram of a prior art method for reducing relative input noise in a fiber optic gyroscope. The present invention is better appreciated by a comparison of FIG. 2 with FIG. 1B. As shown in FIG. 1B, system 100 employs a feedback loop for controlling fiber light source 110 by using relatively low bandwidth (approximately 100–200 kHz) servo electronics 140 to vary the fiber light source pump current via block 150. This method uses intensity modulation of the light to allow the servo circuitry to compensate for lower frequency components of relative intensity noise. However, because of the practical upper limit on the frequency of the pump current modulation, this method is inherently limited to suppression of lower frequency relative intensity noise components.

Figure 2:
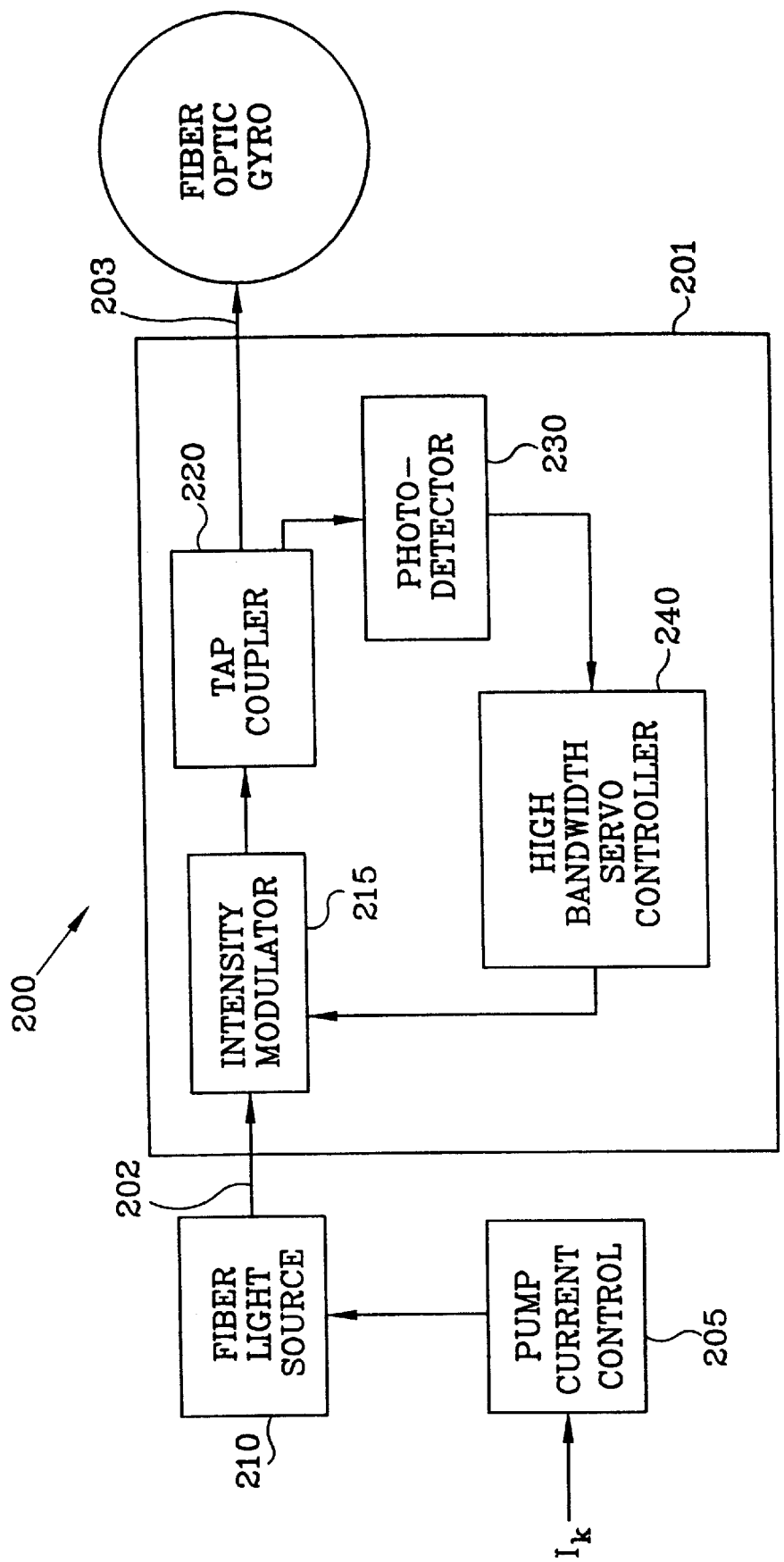
FIG. 2 is a block diagram of the present invention, showing an intensity modulation servo loop.

FIG. 2 is a block diagram of a fiber optic gyroscope 200, showing an exemplary embodiment of the light intensity modulation servo loop 201 of the present invention. Fiber light source 210 is typically a solid state (semiconductor) laser which produces light at wavelengths in the near-infrared region, between 0.83 micrometer and 1.55 micrometers. The light from light source 210 is intensity modulated by electro-optic intensity modulator 215 which can be, for example, a titanium indiffused niobate or proton exchange lithium niobate intensity modulator. The modulated light is then sampled using tap coupler 220 to measure a fraction of the light at the output of intensity modulator 215. Note that the circuitry shown by reference no. 102 (in FIG. 1) comprises a basic prior art fiber optic gyroscope, and is shown for the purpose of providing one exemplary frame of reference for the present system 200. The sampled light is supplied to photodetector 230, which senses the optical signal in the form of a current and converts the sensed current to voltage. Photo-detector 230 includes a photodiode and a trans-impedance amplifier. The output signal from photodetector 230 is then applied to high-bandwidth servo controller 240, which provides negative feedback to the high speed intensity modulator 215 to cancel out intensity fluctuations at the photodetector and thereby stabilize the servo loop. As explained in greater detail below, servo controller 240 has a bandwidth of approximately 1 megahertz, which is a sufficiently high bandwidth to control the intensity modulation of the light to thereby suppress relative intensity noise, including highfrequency components thereof which were not suppressed by the prior art.

In the context of system 100, the servo loop 201 of the present invention is preferably connected in the circuit at the point identified by reference no. 125, with line 202 connected to coupler 104, and line 203 connected to photodetector 105. Alternatively, servo loop 201 could be connected at reference no. 126 in system 100, between coupler 104 and integrated optics package 112.

Figure 3:
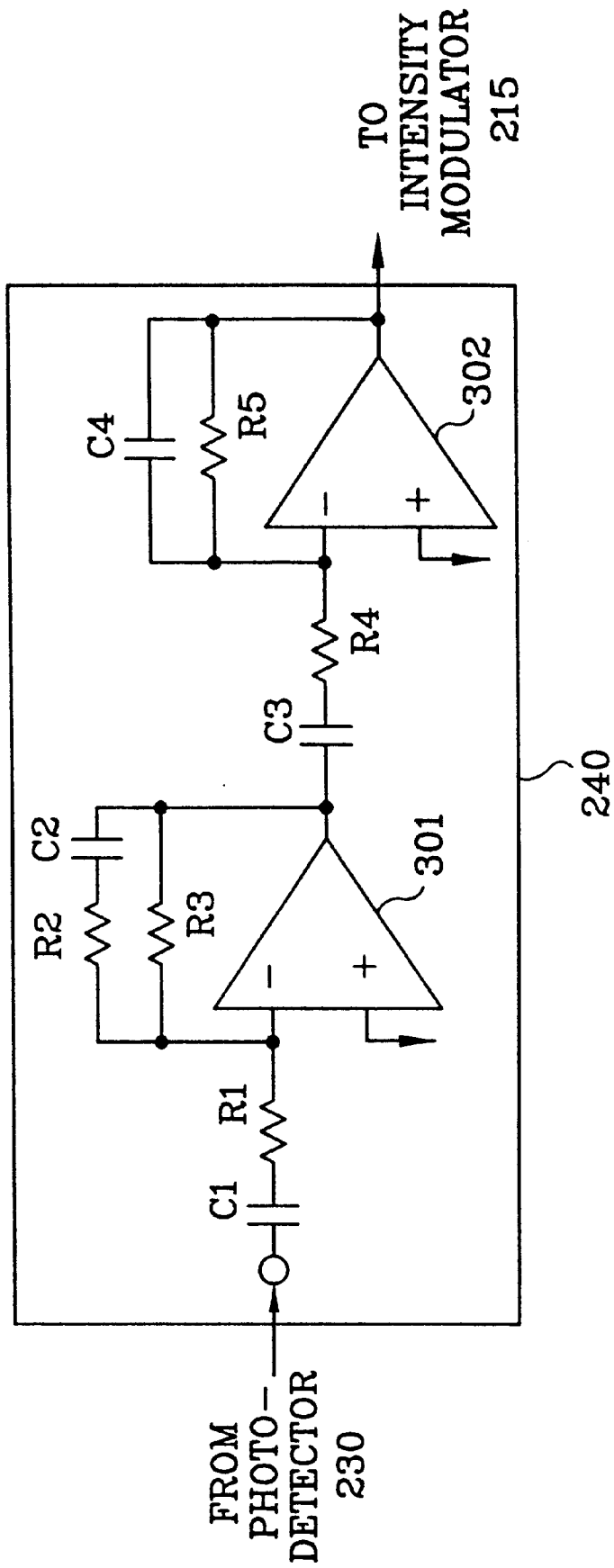
FIG. 3 is a schematic diagram of the electronics which control the high-bandwidth servo loop of the present invention.

FIG. 3 a schematic diagram of the electronics which are employed in an exemplary embodiment of servo controller 240 to control the high-bandwidth servo loop 201 of the present invention. In operation, when the light intensity at photodetector 230 starts to increase, servo controller 240 provides a negative feedback signal to intensity modulator 215 to decrease the light transmission through intensity modulator 215, which causes the light level at photodetector 230 to decrease correspondingly. Since the circuit does not have infinite gain, there must some intensity fluctuation at the photodetector to provide a signal so that the servo loop circuitry can generate a negative feedback signal.

The residual light intensity fluctuation at photodetector 230 at a given frequency depends on the open loop gain of the entire servo loop 201. For relatively high open loop gains, the noise reduction at the photodetector is approximately proportional to the inverse of the open loop gain. To achieve high noise reduction at a given frequency, the open loop gain must be high at that frequency. The transfer function of demodulator 107 shows that the intensity noise must be reduced to at least 800 kHz, and therefore the open loop gain of the entire feedback loop must be greater than unity up to at least 800 kHz. To significantly reduce noise at the bias modulation frequency (typically 20 kHz) and the first few odd harmonics of the bias modulation frequency (where the sensitivity of the demodulator is relatively high) the open loop gain must be greater than 50.

The first stage (operational amplifier 301 and associated capacitors C1,C2 and resistors R1,R2,R3) of servo controller circuit 240 provides loop gain at frequencies at the bias modulation frequency and at many of the odd harmonics thereof. The gain of the first stage decreases at frequencies lower than the bias modulation frequency and is primarily determined by C1, R1 and R3. The gain peaks somewhere around the bias modulation frequency and is primarily determined by R1 and C2. In order for the servo loop to be stable, the gain of this stage must be essentially constant with frequency when the total open loop gain crosses unity (around 2 MHz). At high frequencies (above 500 kHz) the gain of this stage is determined primarily by R1 and R2, and is thus constant with frequency.

The second stage of servo controller circuit 240 (operational amplifier 302 and associated capacitors C3,C4 and resistors R4,R5) also provides loop gain at frequencies at the bias modulation frequency and many of the odd harmonics thereof. The gain of the second stage decreases at frequencies lower than the bias modulation frequency and is primarily determined by C3, R4 and R5. The gain peaks somewhere around the bias modulation frequency and is primarily determined by R4 and C4. In order for the loop to be stable, the gain of this stage does not have to be constant with frequency when the total open loop gain crosses unity (around 2 MHz). Therefore the gain of this stage at high frequencies above 500 kHz is still determined primarily by R4 and C4. It is preferable that the values of resistors R1–R5 and capacitors C1–C4 are selected such that the highest possible open loop gain is achieved while maintaining a stable feedback loop.

It is to be understood that the claimed invention is not limited to the description of the preferred embodiment, but encompasses other modifications and alterations within the scope and spirit of the inventive concept.

We claim:

1. A system for suppression of relative intensity noise in a fiber optic gyroscope utilizing a light source, the system comprising:
   a modulator for generating an intensity modulated light by modulating light emitted from said light source;
   a tap coupler for receiving said intensity modulated light and sampling a part thereof to provide a sampled signal;
   a photodetector for sensing said sampled signal as a current and converting said sampled signal to a detected signal having a voltage proportional to said current; and
   servo control logic, responsive to said detected signal, for generating an error signal to cause said modulator to vary the intensity of said light received from said light source to cancel out intensity fluctuations of the light at said photodetector, thereby suppressing said relative intensity noise, wherein said modulator, said tap coupler, said photodetector, and said servo control logic comprise a feedback loop which utilizes negative feedback to control said intensity fluctuations, and wherein said servo control logic comprises a voltage amplifier having characteristics such that the open loop gain of said feedback loop is greater than unity up to at least 800 kilohertz.

2. The system of claim 1, wherein said servo control logic has a bandwidth of at least 800 kilohertz, and wherein said modulator is capable of modulating said light at a rate responsive to variations in said error signal up to a frequency of at least 800 kilohertz.

3. The system of claim 1, wherein said photodetector comprises a photodiode and a trans-impedance amplifier.

4. A feedback loop for reducing light intensity fluctuations in a fiber optic gyroscope utilizing a light source, the feedback loop comprising:
   a modulator for generating an intensity modulated light by modulating light emitted from said light source;
   a tap coupler, operatively connected to said modulator, for receiving said intensity modulated light and sampling a part thereof to provide a sampled signal;
   a photodetector, operatively connected to said tap coupler, for sensing said sampled signal as a current and converting said sampled signal to a detected signal having a voltage proportional to said current; and
   servo control logic, operatively connected between said photodetector and said modulator, and responsive to said detected signal, for producing an error signal to cause said modulator to control the intensity of said light received from said light source by canceling out the intensity fluctuations of the light in said feedback loop.

5. The system of claim 4, wherein said servo control logic comprises a voltage amplifier having characteristics such that the open loop gain of said feedback loop is greater than unity up to at least 800 kilohertz.

6. The system of claim 4, wherein said servo control logic has a bandwidth of at least 800 kilohertz, and wherein said modulator is capable of modulating said light at a rate responsive to variations in said error signal up to a frequency of at least 800 kilohertz.

7. A method for suppression of relative intensity noise in a fiber optic gyroscope utilizing a light source, the method comprising the steps of:
   receiving light emitted from said light source and sampling a part of the light to provide a sampled signal;
   sensing said sampled signal to provide a control signal representing an intensity of the light; and
   varying said intensity of the light received from said light source, in response to said control signal, to cancel out intensity fluctuations of the light and thereby suppress said relative intensity noise; and
   amplifying said control signal to produce an error signal; wherein the step of varying said intensity of the light includes modulating the intensity of the light received from said light source in accordance with said error signal, and wherein said intensity of said light is modulated at a rate responsive to variations in said error signal up to a frequency of at least 800 kilohertz.

8. A servo system for suppression of relative intensity noise in a fiber optic gyroscope using a light source, the system comprising:
   modulating means for generating an intensity modulated light by modulating the light received from said light source;
   sampling means for receiving said intensity modulated light to produce a sampled signal;
   detecting means for sensing said sampled signal and converting said sampled signal to a control signal proportional to an intensity of the light received; and
   servo control means, responsive to said control signal, for producing an error signal to cause said modulating means to cancel out intensity fluctuations of said light received from said light source, thereby causing suppression of said relative intensity noise, wherein said servo control means is a voltage amplifier having a bandwidth of at least 800 kilohertz, and wherein said modulating means is capable of modulating said light at a rate responsive to variations in said error signal up to a frequency of at least 800 kilohertz.

9. The system of claim 8, wherein said modulating means, said sampling means, said detecting means and said servo control means comprise a feedback loop which utilizes negative feedback to cancel out said intensity fluctuations.

10. The system of claim 8, wherein said voltage amplifier having characteristics such that the open loop gain of said feedback loop is greater than unity up to at least 800 kilohertz.

* * * * *